(12) United States Patent
Kasten et al.

(10) Patent No.: US 10,634,890 B1
(45) Date of Patent: Apr. 28, 2020

(54) MINIATURIZED MICROSCOPE FOR PHASE CONTRAST AND MULTICOLOR FLUORESCENCE IMAGING

(71) Applicant: General Electric Company, Schenectady, NY (US)

(72) Inventors: Ansas Matthias Kasten, Schenectady, NY (US); William Albert Challener, Glenville, NY (US); Jason Harris Karp, Schenectady, NY (US); Sudeep Mandal, Morrisville, NC (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 11 days.

(21) Appl. No.: 16/171,707

(22) Filed: Oct. 26, 2018

(51) Int. Cl.
| | | |
|---|---|---|
| G02B 21/00 | (2006.01) | |
| G01N 21/64 | (2006.01) | |
| G02B 21/24 | (2006.01) | |

(52) U.S. Cl.
CPC ..... G02B 21/0032 (2013.01); G01N 21/6428 (2013.01); G02B 21/0044 (2013.01); G02B 21/0076 (2013.01); G02B 21/241 (2013.01)

(58) Field of Classification Search
CPC ............ G02B 21/0032; G02B 21/0044; G02B 21/0076; G02B 21/241; G01N 21/6428
See application file for complete search history.

(56) References Cited

U.S. PATENT DOCUMENTS

| | | |
|---|---|---|
| 6,934,079 B2 | 8/2005 | Hell et al. |
| 7,184,610 B2 | 2/2007 | Weinstein et al. |
| 7,561,326 B2 * | 7/2009 | Funk .................. G01J 3/02 359/368 |
| 7,864,369 B2 | 1/2011 | Olszak et al. |
| 8,624,967 B2 | 1/2014 | O'Connell et al. |
| 9,921,406 B2 | 3/2018 | Wang et al. |
| 2004/0023415 A1 | 2/2004 | Sokolov et al. |
| 2006/0012872 A1 | 1/2006 | Hayashi et al. |
| 2011/0300490 A1 * | 12/2011 | Rachet ............... G02B 21/0032 430/322 |
| 2013/0079236 A1 * | 3/2013 | Holmes ............... G01N 33/50 506/9 |

(Continued)

FOREIGN PATENT DOCUMENTS

EP    0991959 B1    6/2004

OTHER PUBLICATIONS

Bechtel, Christin, et al.; "Large field of view MEMS-based confocal laser scanning microscope for fluorescence imaging", Optik—International Journal for Light and Electron Optics, vol. 125, Issue:02, pp. 876-882, Jan. 2014.

(Continued)

Primary Examiner — Marcus H Taningco
(74) Attorney, Agent, or Firm — Fletcher Yoder, P.C.

(57) ABSTRACT

A microscope is provided. The microscope includes an illumination source configured to provide illumination beams to image a portion of a biological sample. The microscope also includes an optical unit configured to enable both phase contrast imaging and multicolor fluorescence imaging of the portion of the biological sample utilizing parallel point scanning. The microscope further includes a detector configured to simultaneously acquire multiple point images at different locations of the portion of the biological sample.

20 Claims, 6 Drawing Sheets

(56) References Cited

U.S. PATENT DOCUMENTS

| | | | |
|---|---|---|---|
| 2013/0162800 A1* | 6/2013 | Kim | G02B 21/14 |
| | | | 348/79 |
| 2015/0087902 A1 | 3/2015 | Mertz et al. | |
| 2016/0069919 A1* | 3/2016 | Holmes | G01N 21/07 |
| | | | 506/2 |
| 2018/0089817 A1* | 3/2018 | Blumrich | G06T 7/55 |

OTHER PUBLICATIONS

Uranga, Javier, et al.; "Miniaturized microscope for high throughput screening of tumor spheroids in microfluidic devices", SPIE 10497 Imaging, Manipulation, and Analysis of Biomolecules, Cells, and Tissues XVI, vol. 10497, San Francisco, Feb. 20, 2018.

\* cited by examiner

MINIATURIZED MICROSCOPE FOR PHASE CONTRAST AND MULTICOLOR FLUORESCENCE IMAGING

BACKGROUND

The subject matter disclosed herein relates to a microscope, in particular, a miniaturized microscope that enables both phase contrast and multicolor fluorescence imaging.

Microscopes are used for acquiring information regarding one or more properties or aspects of biological samples. Certain types of microscopes (e.g., fluorescent microscopes) require sophisticated and expensive optical lenses, one or more motion control stages, and a charge coupled device (CCD) camera. Further, certain microscopes utilize bulky and expensive components (e.g., high precision actuators for autofocusing). As a result, the traditional fluorescent microscopes are bulky, slow, and costly. Due to these attributes, the utilization of these microscopes is limited to laboratory settings, which makes it difficult for them to be utilized in the field. Even further, these microscopes may be limited in their functionality (i.e., the types of imaging that may be utilized or having a limited field of view).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a microscope is provided. The microscope includes an illumination source configured to provide illumination beams to image a portion of a biological sample. The microscope also includes an optical unit configured to enable both phase contrast imaging and multicolor fluorescence imaging of the portion of the biological sample utilizing parallel point scanning. The microscope further includes a detector configured to simultaneously acquire multiple point images at different locations of the portion of the biological sample.

In accordance with another embodiment, a microscope is provided. The microscope includes an optical unit configured to enable both phase contrast imaging and multicolor fluorescence imaging of a portion of a biological sample utilizing parallel point scanning. The optical unit includes a first microlens array. The optical unit also includes an edge long-pass filter disposed on a backside of the first microlens array, wherein the edge long-pass filter is configured to form a respective condenser annulus associated with a respective lens element of the first microlens array, wherein the edge long-pass filter is configured to enable a portion of a beam at a first wavelength to pass through to the first microlens array, and the edge-long filter is transparent to beams at a second and a third wavelength different from the first wavelength. The optical unit further includes a second microlens array, wherein the second microlens array is configured to collimate a diffracted transmitted beam at the first wavelength from the biological sample, and the second microlens array is configured to collect fluorescent beams emitted by the biological sample at the second wavelength and the third wavelength. The optical unit still further includes an absorption filter and an interference notch filter located downstream of the first and second microlens array and the microarray phase plate, wherein the absorption filter and the interference notch filter are configured to be transparent to the beam at the first wavelength and block excitation beams of different wavelengths while only allowing emitted fluorescent beams at the second and third wavelengths to pass. The optical unit even further includes a third microlens array and a fourth microlens array located downstream of the absorption filter and the interference notch filter, wherein the third microlens array and the fourth microlens array are configured to spatially filter the transmitted beam at the first wavelength and the undiffracted beam at the first wavelength that has passed through the biological sample and to spatially filter the emitted fluorescent beams at the second and third wavelengths. The first, second, third, and fourth microlens arrays are focally aligned.

In accordance with a third embodiment, a method of manufacturing an optical unit for a microscope configured to enable both phase contrast imaging and multicolor fluorescence imaging of a portion of a biological sample utilizing parallel point scanning is provided. The method includes providing a first microlens array. The method also includes disposing an edge long-pass filter on a backside of the first microlens array, wherein the edge long-pass filter is configured to form a respective condenser annulus associated with a respective lens element of the first microlens array, wherein the edge long-pass filter is configured to enable a portion of a beam at a first wavelength to pass through to the first microlens array, and the edge-long filter is transparent to beams at a second and a third wavelength different from the first wavelength. The method further includes optically aligning a second microlens array with the first microlens array, wherein the second microlens array is configured to collimate a diffracted transmitted beam at the first wavelength from the biological sample, and the second microlens array is configured to collect fluorescent beams emitted by the biological sample at the second wavelength and the third wavelength. The method yet further includes disposing an absorption filter and an interference notch filter downstream of the first and second microlens array, wherein the absorption filter and the interference notch filter are transparent to the beam at the first wavelength and filter the emitted fluorescent beams at the second and third wavelengths. The method still further includes optically aligning a third microlens array, a fourth microlens array, and a pinhole array disposed between the third and fourth microlens array with the first and second microlens arrays downstream of the absorption filter and the interference notch filter, wherein the third microlens array, the pinhole array, and the fourth microlens array are configured to spatially filter the transmitted beam at the first wavelength and the undiffracted beam at the first wavelength that has passed through the biological sample and to spatially filter the emitted fluorescent beams at the second and third wavelengths.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates to a miniaturized, multi-functional microscope. The microscope is designed for both phase contrast and multicolor fluorescence imaging. The microscope may be handheld or fit within the hand. The optical elements together have a total thickness of the less than 5 millimeters (mm). The microscope and its associated components (e.g., power supply, piezo-driven scanner, etc.) are portable (e.g., within a handheld case). This hand held form factor of the microscope may enable it to be utilized in the field (e.g., for point-of-care applications). The microscope includes a plurality of microlens arrays that may be utilized in a parallel point scanning configuration that enables individual spots of a biological sample (e.g., cells or tissue) to be imaged simultaneously, which provides a short acquisition time (e.g., of a few minutes) and a scalable field of view (FOV).

Figure 1:
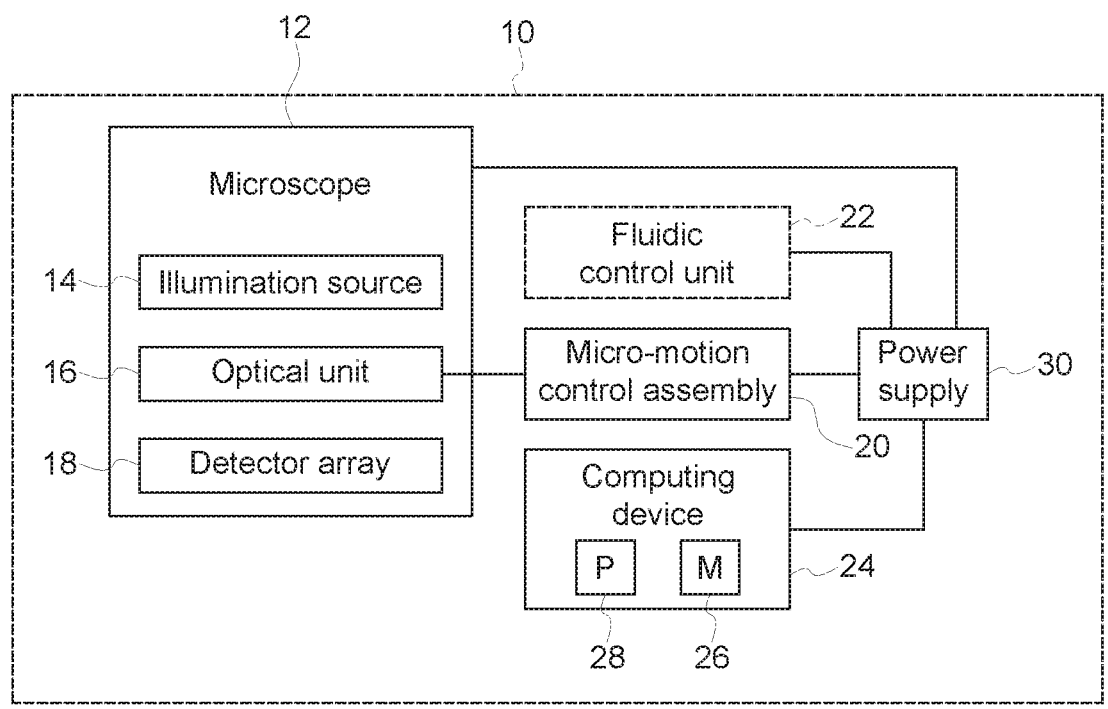
FIG. 1 is a block diagram of a microscopy imaging system, in accordance with aspects of the present disclosure.

Turning to the figures, FIG. 1 is a block diagram of a microscopy imaging system 10. The system 10 includes a microscope 12 (miniaturized, multi-functional microscope). As described in greater detail below, the microscope 12 may be utilized in a variety of configurations such as a trans-illumination configuration, a total internal reflection (TIR)-illumination configuration, and/or an epi-illumination configuration. The microscope 12 includes one or more illumination sources 14. Non-limiting examples of the illumination sources 14 includes a laser source, a light emitting diode (LED), an incandescent lamp, an arc lamp, or combinations thereof. The illumination source 14 provides illumination beams at the biological sample (e.g., cells, tissues, etc.). The biological sample may be a solid sample, fluidic sample, sample with a regular surface, sample with irregular surface, sample with a regular volume, sample with an irregular volume, or a combination thereof. The biological sample may be disposed between a pair of slides and/or within a fluidic chamber. The illumination source 14 may provide single or multiple wavelength illumination beams.

The microscope 12 may include other devices associated with the illumination source 14 such as a collimator (e.g., to collimate the light) and/or a homogenizer (e.g. to homogenize the light).

The microscope 14 also includes an optical unit 16 for imaging the biological sample. As described in greater detail below, the optical unit 16 is configured for both phase contrast and multicolor fluorescent imaging. Phase contrast imaging and multicolor fluorescent imaging may be performed simultaneously or sequentially. Besides various filters for the phase contrast and multicolor fluorescent imaging, the optical unit 16, includes a plurality of microlens arrays disposed in a parallel point scanning configuration. This enables individual spots of the biological sample to be point scanned simultaneously.

The microscope 14 also includes a detector array 18 to acquire point images for each of the individual spots of the biological sample. The detector array 18 (e.g., imager chip) may include a charge-coupled sensor array, complementary metal-oxide semiconductor (CMOS) imager chip, avalanche photodiode array, or other detection device). The detector array 18 detects the light that has passed through the biological sample and/or the fluorescent signal emitted from the biological sample.

The system 10 includes a micro-motion control assembly 20 (e.g., piezo-driven scanner) that moves the biological sample (i.e., the stage or any device supporting the biological sample) during imaging. In particular, the piezo-driven scanner may move the biological sample in the x-direction, y-direction, and/or the z-direction in response to voltage signals. Specifically, the piezo-driven scanner steps the biological sample over a distance of two adjacent microlens elements during the acquisition of individual point images. For example, the biological sample is stepped a distance of a fraction of the pitch between two neighboring lens elements in the microlens array. The image resolution is directly correlated to the step size of the piezo stage that moves the biological sample (assuming the spots generated by the microlens array are not the limiting factor). For example, the pitch between two neighboring lens elements may be 30 µm. As step size of 1 µm in x- and y-direction could be used to generate a point-scanning image with about 1 µm resolution (assuming the illumination/imaging spots from each microlens are smaller than 1 µm in diameter). An entire image can be captured when stepping the distance between the pitch of two neighboring microlens elements in small steps in the x- and in the y-direction. Using this stepping technique, one can fill all the empty spots in a unit cell (e.g., by stepping in circles with decreasing diameters until the entire unit cell has been scanned). By using a microlens array, scanning is done in parallel and all unit cells are scanned at the same time. The field of view for the microscope (or the scanning area) depends on the lateral extend (size) of the microlens array, the pitch between two neighboring microlens array elements is proportional to the number of steps required to fully scan an entire unite cell, and the step size of the piezo stage determines the image resolution. The number of scanning steps are directly proportional to the total imaging time (e.g., total imaging time=number of scanning steps*dwell time per point scan). Complete images are acquired when stitching together each of the individual spots at each position (e.g., like a mosaic picture). A final image or images (e.g., phase contrast images and/or multicolor fluorescence images) may be generated based on the assembly of the individual point images.

The size of both the microlens array and the detector array 18 determine the FOV. For example, the FOV may be scaled up by utilizing a larger microlens array and a larger detector array 18 without increasing the image acquisition time. The resolution of the images depends on the numerical aperture (NA) of the microlenses and the step size of the piezo-driven scanner. The image acquisition time depends on the pitch between each lens element. In certain embodiments, the current embodiments may have a resolution of approximately 2 micrometers (μm), a FOV of 2.54 centimeters (cm) (1 inch) by 2.54 cm (1 inch), and an image acquisition time of a few minutes.

In certain embodiments, the system 10 also includes a fluidic control unit 22. Depending on the biological sample, the fluidic control unit 22 may regulate providing and/or removing different fluids that the biological sample is disposed within. The system 10 includes a computing device 24 (e.g., laptop computer). The computing device 24 includes a memory 26 and a processor 28 configured to execute instructions stored on the memory 22. In certain embodiments, the memory 26 may store instructions for controlling components of the system 10 (e.g., microscope 12, fluidic control unit 22, micro-motion control assembly 20, etc.). The computing device 24 may receive the different images acquired by the detector array 18 for the individual spots and assemble these individual images to generate images (e.g., phase contrast images and/or multicolor fluorescent images) of portions of the biological sample. The system 10 also includes a power supply 30 to provide power to one or more components of the system 10 (e.g., computing device 24, microscope 12, fluidic control unit 22, and/or micro-motion control assembly 20).

The processor 28 may include multiple processors, one or more "general-purpose" microprocessors, one or more special-purpose microprocessors, and/or one or more application specific integrated circuits (ASIC), or some combination thereof. For example, the processor 28 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

The memory 26 may include a volatile memory, such as random access memory (RAM), nonvolatile memory, such as read-only memory (ROM), flash memory, or any combination thereof. The memory 26 may store a variety of information that may be used for various purposes. For example, the memory 26 may store processor-executable instructions (e.g., firmware or software) for the processor 28 to execute, such as instructions for different components of the system 10. The storage device(s) (e.g., nonvolatile storage) may include ROM, flash memory, a hard drive, or any other suitable optical, magnetic, or solid-state storage medium, or a combination thereof.

Figure 2:
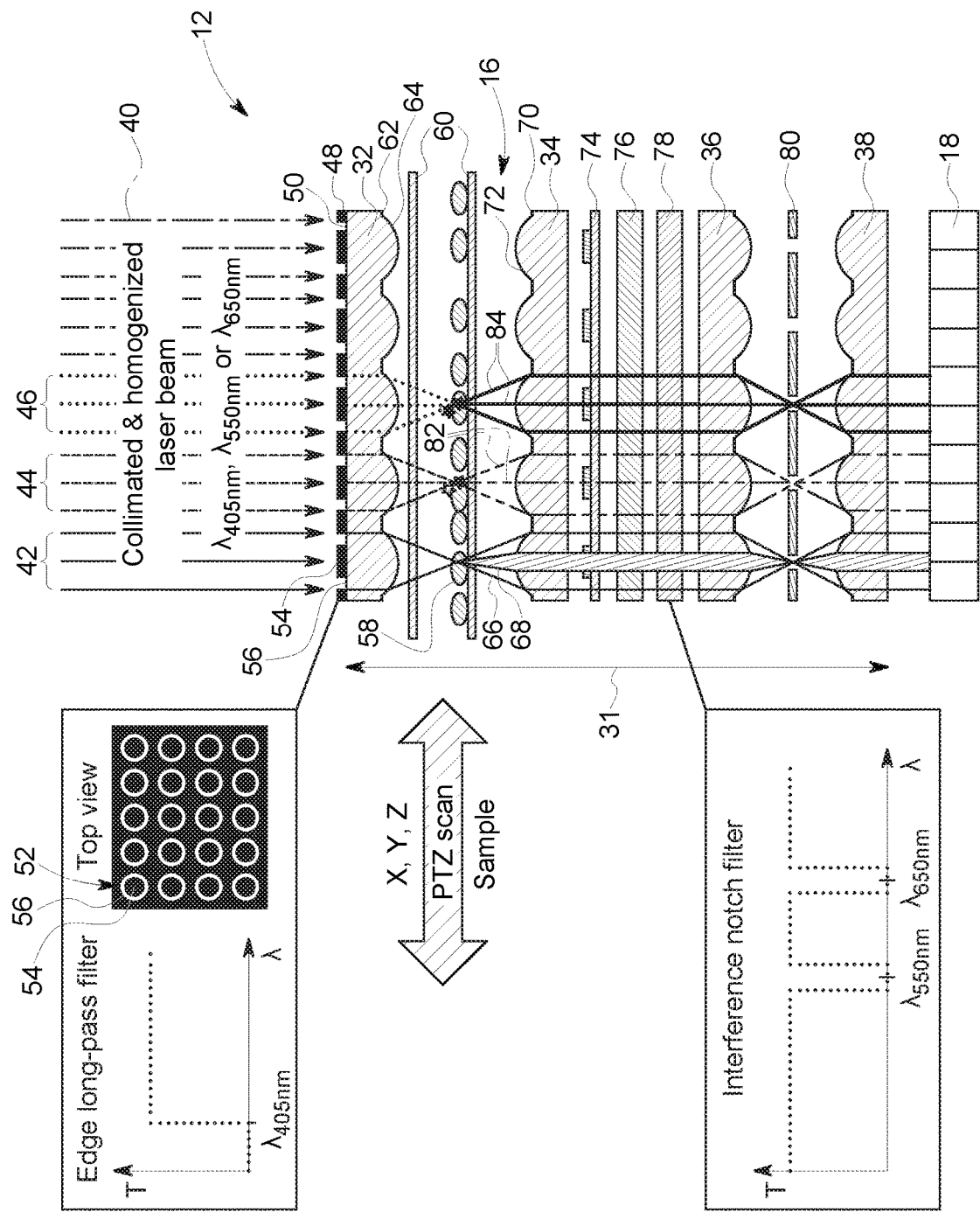
FIG. 2 is schematic diagram of a microscope in a trans-illumination configuration, in accordance with aspects of the present disclosure.

FIG. 2 is schematic diagram of the microscope 12 in a trans-illumination configuration. The optical unit 16 includes an overall thickness 31 of less than 5 mm. The optical unit 16 includes a first microlens array 32, a second microlens array 34, a third microlens array 36, and a fourth microlens array 38. A more compact and simpler version of this trans-illumination configuration could be realized by eliminating elements 36, 80, and 38 at the cost of increased optical cross-talk. The microlens arrays 32, 34, 68, 38 are focally aligned with each other. In the trans-illumination configuration a collimated and homogenized excitation beam 40 is directed onto the first microlens array 32. Multiple excitation wavelengths may be utilized with the microscope 12 (e.g., emitted from the illumination source 14). As depicted, three different wavelengths are described.

For example, a wavelength of 405 nanometers (nm) (indicated by solid arrows 42) is utilized for phase contrast imaging and wavelengths 550 nm (indicated by dashed arrows 44) and 650 nm (indicated by dotted arrows 46) are utilized for excitation in fluorescence imaging. These beams 42, 44, 46 are collimated and homogenized. A larger number of individual wavelengths could be utilized to image a larger number of fluorescent labels. For simplicity, we limit the description of this disclosed embodiments to three individual wavelengths.

The microlens array 32 forms small spots that are used for the excitation of the biological sample. The focal plane or the (fractional) Talbot planes may be utilized to generate the desired spot pattern. In embodiments, utilizing the fractional Talbot planes, a different microlens array has to be utilized to create excitation spots that match the pitch of the microlens array 32 on the light collection side. Talbot plane illumination may be useful when a larger working distance between the microlens array 32 and the biological sample is desired. However, the spot quality may degrade with increasing Talbot plane distance. The Talbot plane distance is strongly dependent on the wavelength of the excitation light. Thus, the z-height of the sample has to be adjusted when different illumination wavelengths are utilized. This is not the case when utilizing the focal plane of the microlens array 32. In this case, the focal distance stays relatively constant for different excitation wavelengths, eliminating the need for extensive adjustments in z-height. In addition, the generated spot pattern will be sharper compared to the spots generated in fractional Talbot planes. Thus, the focal plane is the preferred illumination plane when a smaller working distance can be tolerated. A working distance of approximately 100 μm is typical for microlens arrays with a NA of 0.15.

With regards to phase contrast imaging, an edge-long-pass filter 48 is disposed on a backside 50 (i.e., side that encounters illumination beams first) of the first microlens array 32. In certain embodiments, the edge-long pass filter 48 may be disposed on a separate transparent substrate. The edge-long pass filter 48 is opaque at the wavelength (e.g., 405 nm) utilized for phase contrast imaging and transparent for the 550 and 650 wavelengths (e.g., wavelengths longer than the wavelength utilized for phase contrast imaging and longer than the cutoff wavelength of the edge-long pass filter 48) utilized for fluorescence imaging. The edge-long pass filter 48 serves as a condenser annulus 52 for the 405 nm excitation beam 42. In particular, each lens element of the microlens array 32 is associated with a respective condenser annulus 52. The condenser annulus 52 includes a central portion 54 that blocks the center portion of the 405 nm excitation beam 42. The portion of the 405 nm excitation beam 42 that passes through an annulus portion 56 of the microlens element is focused onto a biological sample 58 (e.g., cells). As depicted, the biological sample 58 is disposed between a pair of glass slides 60. Chrome apertures 62 (e.g., annular chrome apertures) are disposed on a front side 64 (i.e., side opposite the edge long-pass filter 48) to minimize unwanted bleed through of light from the excitation source.

The second microlens array 34 is disposed beneath biological sample 58. A portion 66 of the 405 nm excitation beam 42 is diffracted and phase altered by the sample 58 and a portion 68 of the beam 42 remains undiffracted and passes through the sample 58. Chrome apertures 70 (e.g., annular chrome apertures) are disposed on a side 72 of the microlens array 34 facing the biological sample 58. The chrome apertures 62, 70 reduce bleed-through or cross-talk between adjacent channels (i.e., microlens elements) during fluorescence imaging. The second microlens array 34 collimates the diffracted and phase altered transmitted beam 66. A microarray phase plate 74 is disposed beneath (i.e., downstream of) the second microlens array 34. The phase plate 74 retards the phase altered transmitted beam 66 by 90 degrees, while enabling the undiffracted light 68 to transmit without retardation. An absorption filter 76 and an interference notch filter 78 are disposed beneath the phase plate 74. The absorption filter 76 is disposed between the phase plate 74 and the interference notch filter 78. Both the absorption filter 76 and the interference notch filter 78 are transparent to wavelengths below 550 nm. Thus, the filters 76, 78 are transparent to the beams portions 66, 68. In certain embodiments, the optical unit 16 may include more than one notch filter, where each notch filter is specific for a different wavelength. In certain embodiments, the optical unit 16 may utilize a single notch filter that may include portions specific for a first wavelength and portions specific for a second wavelength different from the first wavelength (e.g., in a checkerboard pattern).

The third microlens array 36 and the fourth microlens array 38 are disposed beneath the filters 76, 78 with the microlens array 36 being adjacent the interference notch filter 78. A pinhole array 80 is disposed in the focal plane between the third and fourth microlens arrays 36, 38. In certain embodiments, the microscope 12 may not include the third and fourth microlens arrays 36, 38 and the pinhole array 80 if a more compact and simpler assembly is desired. The beam portions 66, 68 are spatially filtered by the microlens arrays 36, 38 and the pinhole array 80. The pinhole array 80 blocks any stray light (e.g., to reduce cross-talk between adjacent lenslets). The beam portions constructively and destructively interfere to form a phase contrast image for each illuminated spot of the biological sample 58. These phase contrast point images are detected by the detector array 18. The individually acquired point images are then combined by the computing device 24 to form a complete image (e.g., phase contrast image) after scanning the biological sample step-by-step (via the piezo-driven scanner 20) to fill in the blank spots in a unit cell the size of the pitch between microlens array elements in the x- and y-direction to acquire the complete phase contrast image of the biological sample 58.

With regard to multicolor fluorescent imaging, as mentioned above, excitation beams 44, 46 of 550 nm and 650 nm (which may be utilized to excite Cy3 or Cy5 dyes, respectively) are utilized as examples. Different wavelengths for fluorescent imaging may be utilized. In addition, a different number of wavelengths (e.g., more than two) may be utilized for fluorescent imaging. As depicted, the beams 44, 46 pass through the edge long-pass filter 48 described above. The first microlens array 32 focuses the excitations beams 44, 46 on the biological sample 58 to form illumination spots. As mentioned above, either the focal plane or fractional Talbot planes may be used for spot illumination of the biological sample 58. As mentioned above, the chrome apertures 62, 70 reduce bleed-through and/or cross talk, thus, increasing the signal-to noise ratio (SNR) of the point images. Fluorescent light 82, 84 (for the 550 nm and 650 nm wavelengths, respectively) is emitted from the excited fluorophores. The second microlens array 34 collects the emitted fluorescent light 82, 84, which then passes through both the absorption filter 76 and the interference notch filter 78. The absorption filter 76 removes any stray light caused by scattering of the excitation beams 44, 46. In particular, the absorption filter 76 filters out stray light that impinges on the filter 76 at oblique incidence. The excitation beams 44, 46 that impinge at normal incidence at the biological sample 58 are filtered out by the interference notch filter 78 with high optical density (OD). In certain embodiments, the absorption filter 76 and the interference notch filter 78 may include OD values of +3 and +6, respectively. The emitted and filtered fluorescent light 82, 84 is then spatially filtered by the microlens arrays 36, 38 and the pinhole array 36 described above. The fluorescent signals are then detected by the detector array 18 and combined to form a complete fluorescent image upon scanning of the entire biological sample 58. During the scanning process, fine adjustment in the z-direction may be utilized to keep the sample 58 in focus. However, the focal depth of the microlens arrays 32, 34, 36, 38 tends to be fairly large (e.g., due to the low NA of the lenslets), thus, z-adjustment during scanning may be less critical.

Figure 3:
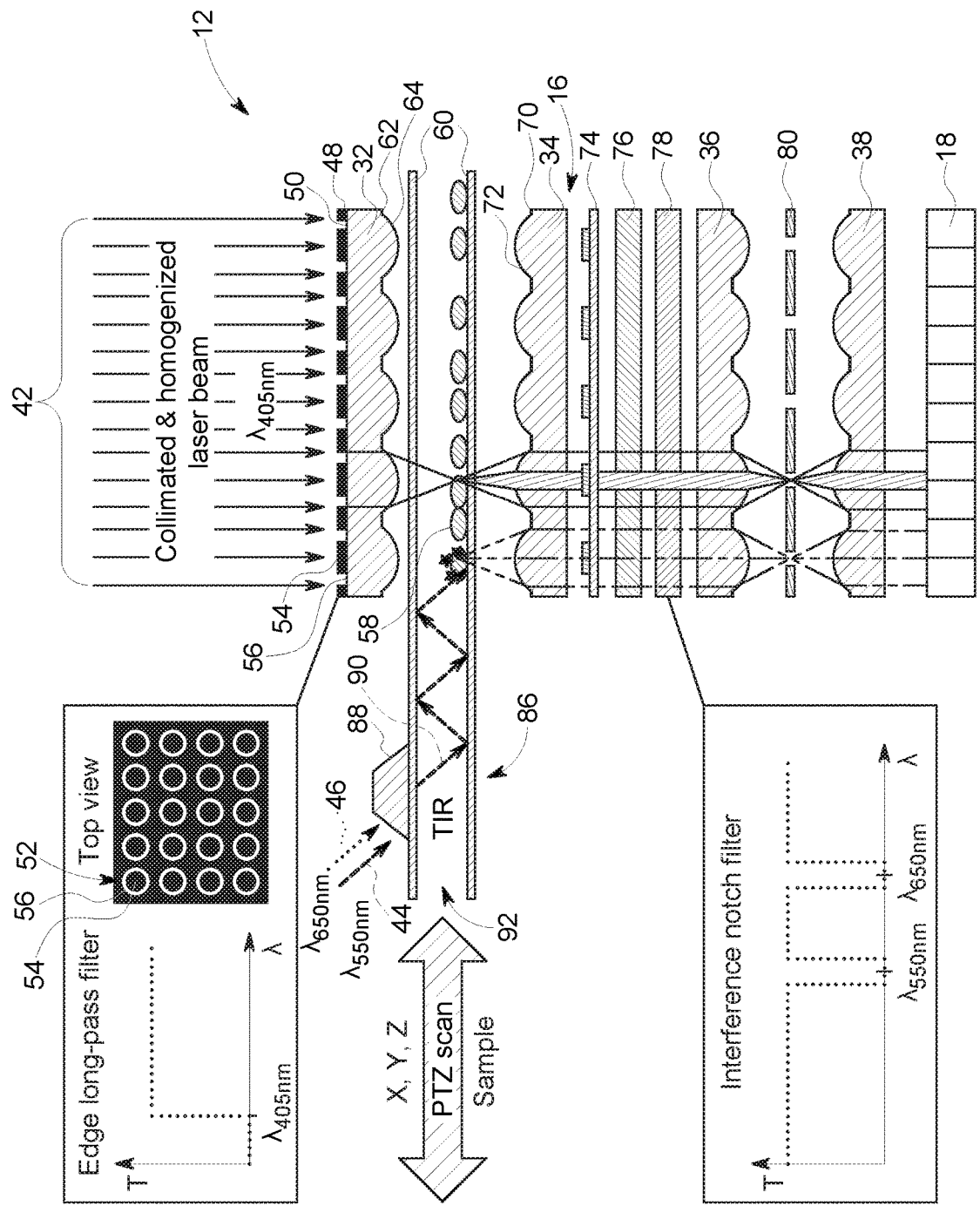
FIG. 3 is a schematic diagram of a microscope in a total internal reflection-illumination configuration, in accordance with aspects of the present disclosure.

FIG. 3 is schematic diagram of the microscope 12 in a total internal reflection (TIR)-illumination configuration. In general, the microscope 12 is as described in FIG. 2. The only difference is that the fluorescence excitation beams 44, 46 (550 nm and 650 nm, respectively) are coupled to a waveguide structure 86. The waveguide structure 86 is formed between the two glass slides 60 and surrounds a high refractive index fluid. The inner surfaces of the glass slides 60 may be coated with a low refractive index film to increase the acceptance angle of the waveguide structure 86. A prism 88 (e.g., transparent prism) is utilized to couple the excitation beams 44, 46 to the waveguide structure 86. Thus, unlike the configuration in FIG. 2, the beams 44, 46 do not pass through the microlens array 32. The TIR captured excitation light 90 (shown for only the 550 nm wavelength) travels down the fluidic channel 92 (formed by the waveguide structured 86) to illuminate the biological sample 58. The TIR-illumination configuration improves the SNR compared to the trans-illumination configuration. The majority of the excitation light remains inside the waveguide structure 86 and is not detected by the detector array 18. This enables a reduction in the filter requirements and may simplify the detection side of the microscope architecture. However, the excitation scheme in the TIR-illumination configuration is more complicated. In addition, the flood exposure of the entire sample 58 in the TIR-illumination configuration may increase bleaching effects of the fluorescent dyes. In the trans-illumination configuration, dye bleaching is minimized since the only spots of the biological sample 58 that are illuminated are those that currently being imaged.

Figure 4:
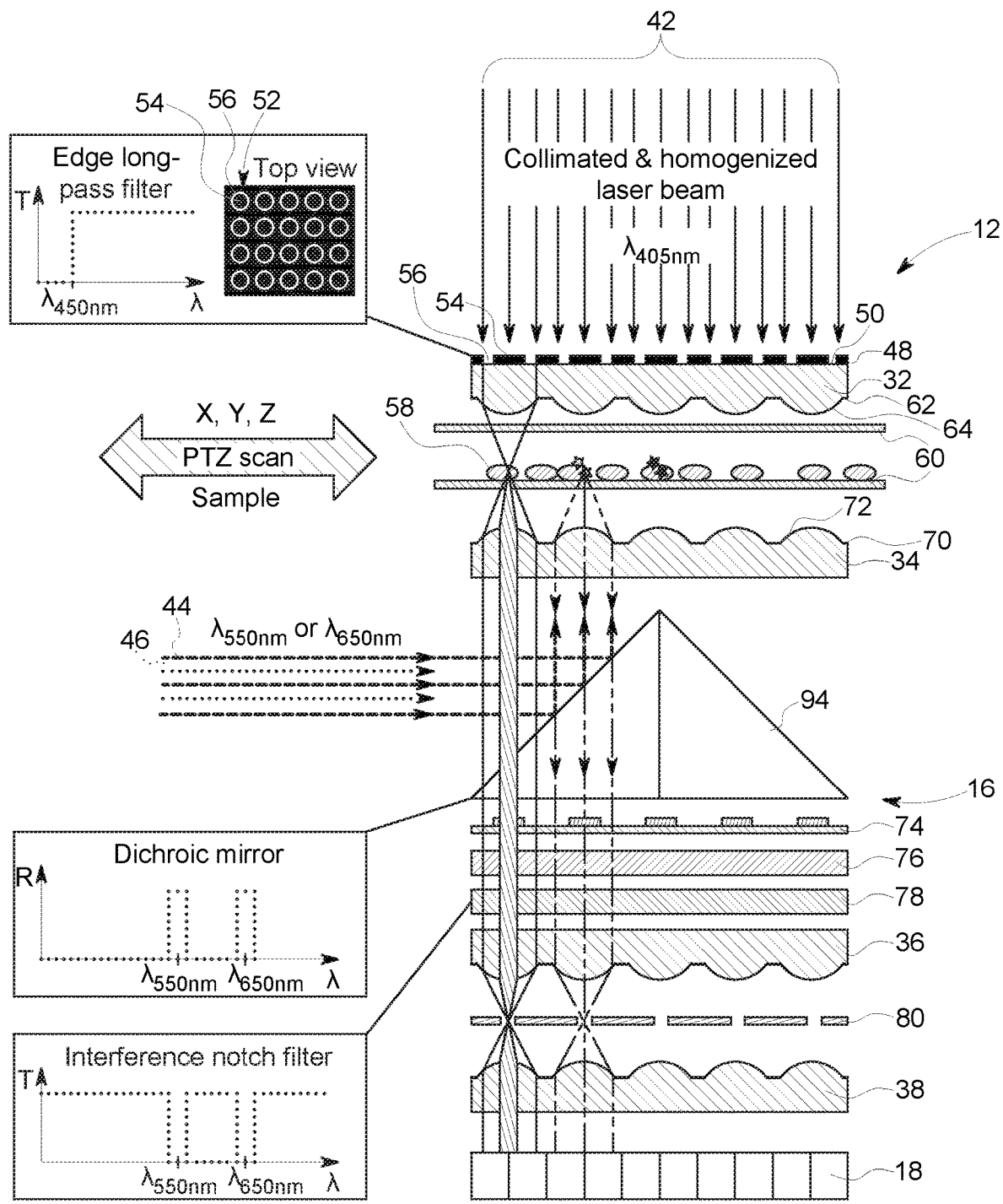
FIG. 4 is a schematic diagram of a microscope in an epi-illumination configuration, in accordance with aspects of the present disclosure.

FIG. 4 is schematic diagram of the microscope 12 in an epi-illumination configuration. In general, the microscope 12 is as described in FIG. 2. The only difference is a dichroic mirror 94 is disposed between the second microlens array 34 and the phase plate 74. The dichroic mirror 94 is high reflective for the excitation beams 44, 46. In particular, the dichroic mirror 94 reflects the excitation beam (only excitation beam 44 is shown for simplicity) toward the biological sample 58, while the dichroic mirror is transparent to the light emitted by the biological sample 58. The epi-illumination configuration combines the advantages of both the trans-illumination and the TIR-illumination configurations. The biological sample 58 is spot-illuminated to avoid excess bleaching of the fluorescent dyes, while improving the SNR by taking the detector array 18 out the direct path of illumination. However, the epi-illumination configuration results in a more complicated and more spacious optical design.

Figure 5:
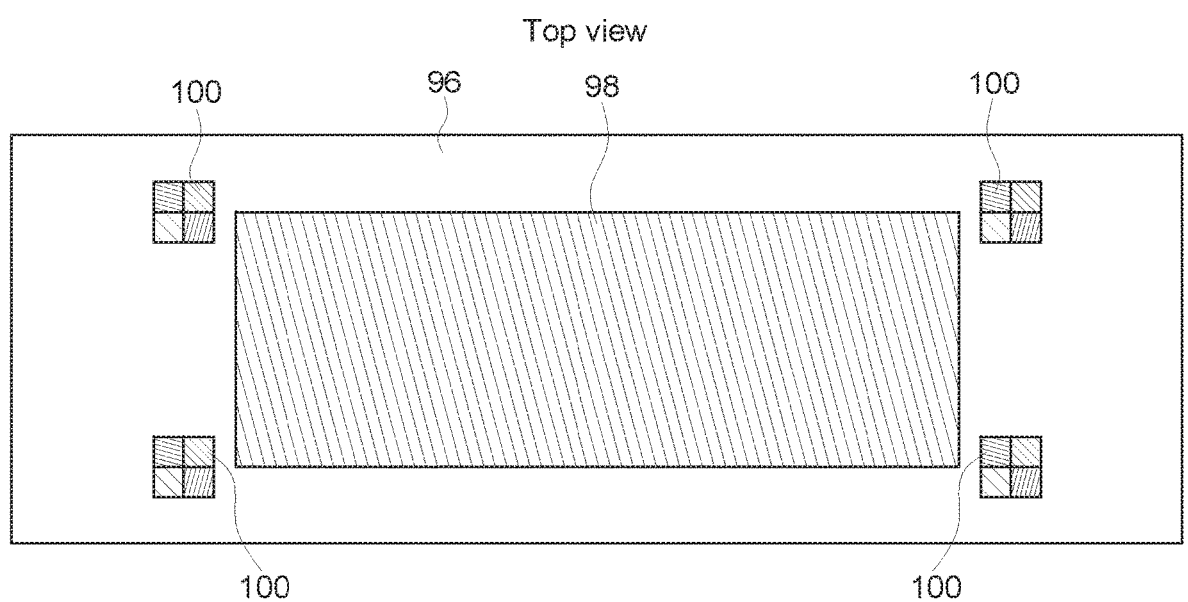
FIG. 5 is a top view of a schematic diagram of a fluorescence and phase contrast labeling scheme for focusing a microscope on a specimen, in accordance with aspects of the present disclosure.
Figure 6:
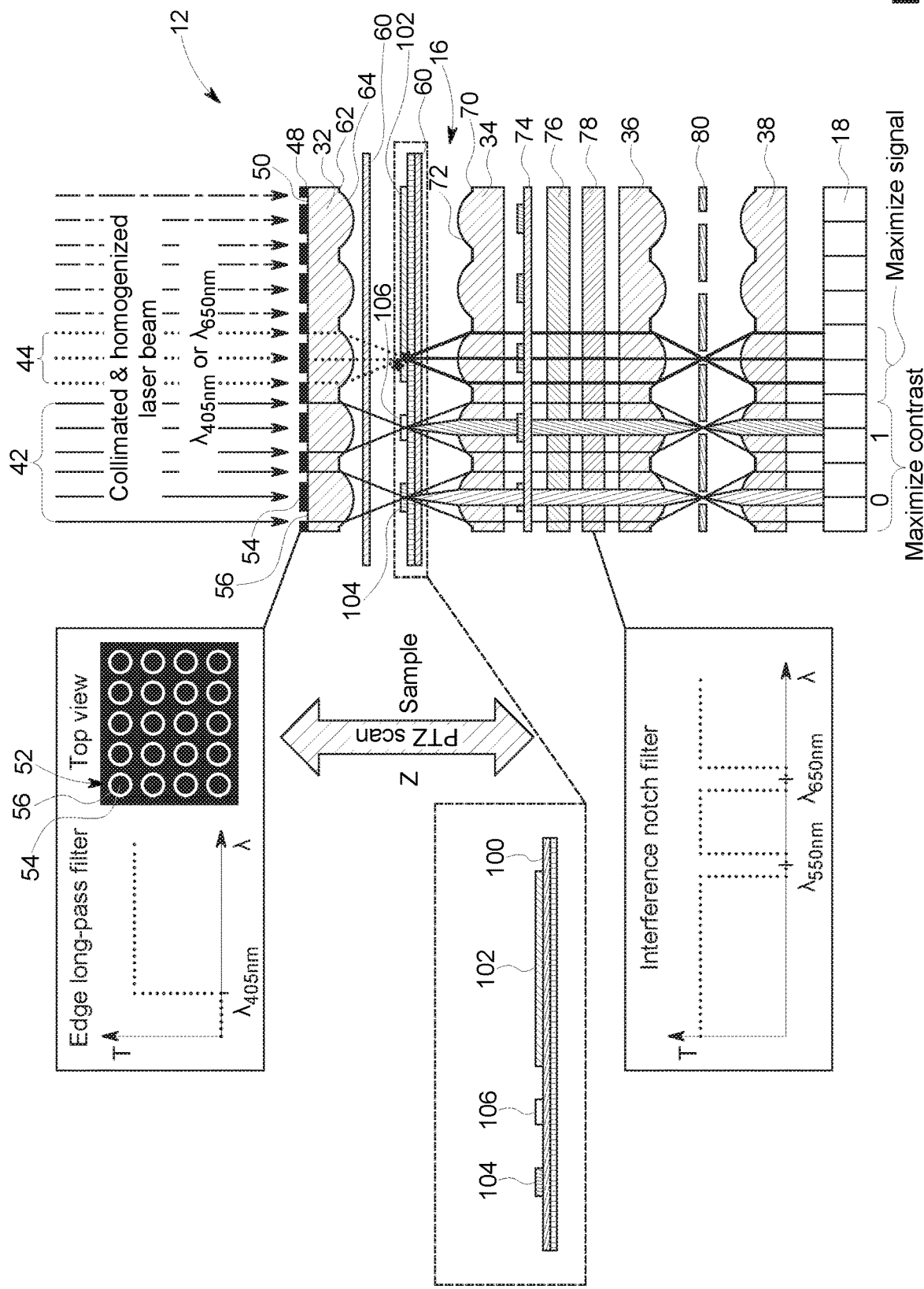
FIG. 6 is a schematic diagram illustrating alignment target focusing utilizing a microscope, in accordance with aspects of the present disclosure.

FIG. 5 is a top view of a schematic diagram of a fluorescence and phase contrast labeling scheme for focusing the microscope 12 on a specimen. FIG. 5 depicts a microfluidic flow cell 96 (e.g., cells of the biological sample or specimen) having a sample area 98 to be imaged. The specimen needs to be brought into focus for the two microlens arrays utilized for illumination and detection. In certain embodiments to achieve focusing of the specimen, fluorescence and phase contrast labels or targets 100 (e.g., alignment targets) are placed on each corner of the sample. The piezo-driven scanner then steps the sample in the z-direction until a maximum intensity in fluorescent signal or a maximum contrast in phase contrast image is detected. This position in the z-direction then correlates with the optimum focal point for the miniaturized microscope system. FIG. 6 depicts the utilization of the target 100 when utilizing the microscope in the trans-illumination configuration. As depicted, the alignment target 100 may include a tissue stained with a fluorescent target 102 (e.g., a dye such as Cy5) to maximize the intensity of the fluorescence signal. A micro patterned phase retarder (or waveplate) 104 and missing retarder (or waveplate) 106 may be utilized to generate a high contrast phase image that maximizes contrast.

Technical effects of the disclosed embodiments include providing a portable, miniaturized microscope that performs multiple imaging functions. The microscope may fit within the hand. The microscope may perform both phase contrast and multicolor fluorescence imaging in conjunction with point scanning. Indeed, the microscope may include multiple microlens arrays in parallel point scanning configuration. Multiple individual spots may be imaged simultaneously. Thus, the microscope may have a large (and scalable) FOV and fast image acquisition time. Due to the size and portability of the microscope, it can be utilized in point-of-care diagnostics (e.g., at home, on the battle field, by first responders, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A microscope, comprising:
an illumination source configured to provide illumination beams to image a portion of a biological sample;
an optical unit configured to enable both phase contrast imaging and multicolor fluorescence imaging of the portion of the biological sample utilizing parallel point scanning; and
a detector configured to simultaneously acquire a plurality of point images at different locations of the portion of the biological sample.

2. The microscope of claim 1, wherein the microscope is portable and configured to be handheld.

3. The microscope of claim 1, wherein the optical unit has an overall thickness of less than 5 millimeters.

4. The microscope of claim 1, wherein the optical unit comprises a first microlens array and an edge long-pass filter disposed on a backside of the first microlens array, wherein the edge long-pass filter is configured to form a respective condenser annulus associated with a respective lens element of the first microlens array, and each respective condenser annulus is configured to block a center portion of an illumination beam at a first wavelength on the respective lens element and to enable the illumination beam at the first wavelength incident upon the respective lens element through the respective condenser annulus to be focused on the portion of biological sample, and wherein the edge long-pass filter is transparent for illumination beams at one or more wavelengths different from the first wavelength.

5. The microscope of claim 4, wherein the optical unit comprises a second microlens array focally aligned with the first microlens array, wherein the second microlens array is configured to collimate a diffracted and phase altered transmitted beam at the first wavelength from the biological sample, and the second microlens array is configured to collect fluorescent light emitted by the biological sample at the one or more wavelengths.

6. The microscope of claim 5, comprising a microarray phase plate configured to retard by 90 degrees the collimated phase altered transmitted beam and to enable undiffracted light at the first wavelength that passed through biological sample to pass through.

7. The microscope of claim 6, comprising an absorption filter and an interference notch filter located downstream of the first and second microlens array and the microarray phase plate, wherein the absorption filter and the interference notch filter are transparent to light at the first wavelength and filter the emitted fluorescent light at the one or more wavelengths.

8. The microscope of claim 7, comprising a third microlens array and a fourth microlens array focally aligned with the first and second microlens array and located downstream of the absorption filter and the interference notch filter, and a pinhole array disposed between the third and fourth microlens array, and wherein the third microlens array, the pinhole array, and the fourth microlens array are configured to spatially filter the phase altered transmitted beam and the undiffracted light at the first wavelength and to spatially filter the emitted fluorescent light at the one or more wavelengths for detection by the detector.

9. The microscope of claim 7, comprising a dichroic mirror disposed between the second microlens array and the microarray phase plate that is reflective at the second and third wavelengths.

10. The microscope of claim 1, comprising a piezo-driven scanner configured to move the biological sample in multiple directions, wherein the piezo-driven scanner is configured to step the biological sample one lens element pitch in both a first direction and a second direction.

11. The microscope of claim 1, comprising a processor configured to generate a phase contrast image and a multicolor fluorescence image of the portion of the biological sample based on the plurality of point images at different locations.

12. The microscope of claim 1, wherein the microscope is configured to be utilized in a trans-illumination configuration, a total internal reflection-illumination configuration, and an epi-illumination configuration.

13. The microscope of claim 1, comprising a waveguide structure formed by a pair of glass slides surrounding a high refractive index fluid, and a prism configured to provide the illumination beams at the one or more wavelengths to the waveguide structure for illuminating the biological sample.

14. A microscope, comprising:
an optical unit configured to enable both phase contrast imaging and multicolor fluorescence imaging of a portion of a biological sample utilizing parallel point scanning, wherein the optical unit comprises:

a first microlens array;

an edge long-pass filter disposed on a backside of the first microlens array, wherein the edge long-pass filter is configured to form a respective condenser annulus associated with a respective lens element of the first microlens array, wherein the edge long-pass filter is configured to enable a portion of a beam at a first wavelength to pass through to the first microlens array, and the edge-long filter is transparent to beams at a second and a third wavelength different from the first wavelength;

a second microlens array, wherein the second microlens array is configured to collimate a diffracted transmitted beam at the first wavelength from the biological sample, and the second microlens array is configured to collect fluorescent beams emitted by the biological sample at the second wavelength and the third wavelength;

an absorption filter and an interference notch filter located downstream of the first and second microlens array, wherein the absorption filter and the interference notch filter are configured to be transparent to the beam at the first wavelength and block excitation beams of different wavelengths while only allowing emitted fluorescent beams at the second and third wavelengths to pass; and a third microlens array and a fourth microlens array located downstream of the absorption filter and the interference notch filter, and a pinhole array disposed between the third and fourth microlens array, and wherein the third microlens array, the pinhole array, and the fourth microlens array are configured to spatially filter the transmitted beam at the first wavelength and the undiffracted beam at the first wavelength that has passed through the biological sample and to spatially filter the emitted fluorescent beams at the second and third wavelengths;

wherein the first, second, third, and fourth microlens arrays are focally aligned.

15. The microscope of claim 14, wherein each respective condenser annulus is configured to block a center portion of the beam at the first wavelength on the respective lens element and to enable the beam at the first wavelength incident upon the respective lens element through the respective condenser annulus to be focused on the portion of biological sample.

16. The microscope of claim 14, wherein the optical unit has an overall thickness of less than 5 millimeters.

17. The microscope of claim 14, wherein the optical unit comprises a microarray phase plate configured to retard by 90 degrees the collimated phase altered transmitted beam and to enable the undiffracted beam at the first wavelength that passed through biological sample to pass through.

18. A method of manufacturing an optical unit for a microscope configured to enable both phase contrast imaging and multicolor fluorescence imaging of a portion of a biological sample utilizing parallel point scanning, comprising:

providing a first microlens array;

disposing an edge long-pass filter on a backside of the first microlens array, wherein the edge long-pass filter is configured to form a respective condenser annulus associated with a respective lens element of the first microlens array, wherein the edge long-pass filter is configured to enable a portion of a beam at a first wavelength to pass through to the first microlens array, and the edge-long filter is transparent to beams at a second and a third wavelength different from the first wavelength;

optically aligning a second microlens array with the first microlens array, wherein the second microlens array is configured to collimate a diffracted transmitted beam at the first wavelength from the biological sample, and the second microlens array is configured to collect fluorescent beams emitted by the biological sample at the second wavelength and the third wavelength;

disposing an absorption filter and an interference notch filter downstream of the first and second microlens array, wherein the absorption filter and the interference notch filter are configured to be transparent to the beam at the first wavelength and block excitation beams of different wavelengths while only allowing emitted fluorescent beams at the second and third wavelengths to pass; and optically aligning a third microlens array, a fourth microlens array, and a pinhole array disposed between the third and fourth microlens array with the first and second microlens arrays downstream of the absorption filter and the interference notch filter, wherein the third microlens array, the pinhole array, and the fourth microlens array are configured to spatially filter the transmitted beam at the first wavelength and the undiffracted beam at the first wavelength that has passed through the biological sample and to spatially filter the emitted fluorescent beams at the second and third wavelengths.

19. The method of claim 18, comprising disposing a microarray phase plate between the second microlens array and the absorption filter, wherein the microarray phase plate is configured to retard by 90 degrees the collimated phase altered transmitted beam and to enable the undiffracted beam at the first wavelength that passed through biological sample to pass through.

20. The method of claim 18, wherein the optical unit has an overall thickness of less than 5 millimeters.

* * * * *